(12) United States Patent
Sadeck

(10) Patent No.: US 8,025,254 B2
(45) Date of Patent: Sep. 27, 2011

(54) APPARATUS FOR RELEASING A PARACHUTE FROM ITS PAYLOAD

(75) Inventor: James E. Sadeck, East Freetown, MA (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 1007 days.

(21) Appl. No.: 11/811,527

(22) Filed: Jun. 11, 2007

(65) Prior Publication Data

US 2008/0302917 A1    Dec. 11, 2008

(51) Int. Cl.
*B64D 17/62* (2006.01)

(52) U.S. Cl. .................................................. 244/151 B

(58) Field of Classification Search ....... 244/147.151 A, 244/151 B; 24/633; 294/82.25; 292/251; 403/325, 326
See application file for complete search history.

(56) References Cited

U.S. PATENT DOCUMENTS

| | | | |
|---|---|---|---|
| 2,502,097 A | 3/1950 | Linder | |
| 2,562,459 A | 7/1951 | Hoey | |
| 2,665,163 A | 1/1954 | Gross | |
| 2,732,245 A | 1/1956 | Lemoigne | |
| 2,919,154 A | 12/1959 | Schart | |
| 4,619,424 A | 10/1986 | Twardawa | |
| 5,687,931 A | 11/1997 | Hogan | |
| 6,644,597 B1 * | 11/2003 | Bahniuk | 244/151 B |
| 7,568,661 B2 * | 8/2009 | Bahniuk | 244/151 B |

* cited by examiner

*Primary Examiner* — Joshua J Michener
*Assistant Examiner* — Brian M O'Hara
(74) *Attorney, Agent, or Firm* — Vincent Ranucci; Roger C. Phillips

(57) ABSTRACT

An apparatus for releasing a parachute from its payload upon ground impact by the payload. The apparatus has a pair of sections releasably secured to each other. Each section has an intermediate portion having a longitudinally extending axis and a spur receiving opening that extends through the intermediate portion and is transverse to the longitudinally extending axis, a first end portion attached to the intermediate portion and comprising a spur that extends in a generally lateral direction with respect to the longitudinally extending axis, and a second end portion attached to the intermediate portion such that the intermediate portion is between the first and second end portions. Each section is configured so that a lanyard can be connected to the section wherein in order to use the apparatus, a lanyard is attached to and between one section and a parachute, and another lanyard is attached to and between the other section and a payload.

8 Claims, 6 Drawing Sheets

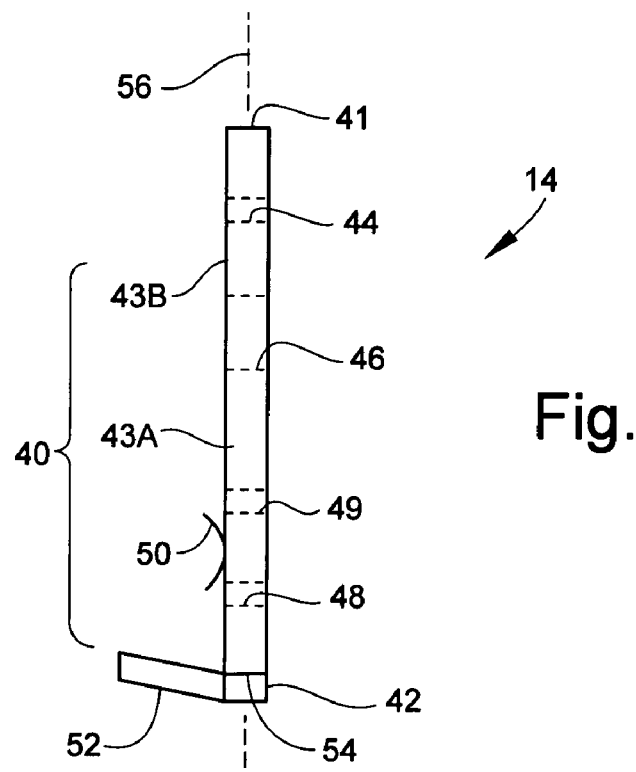
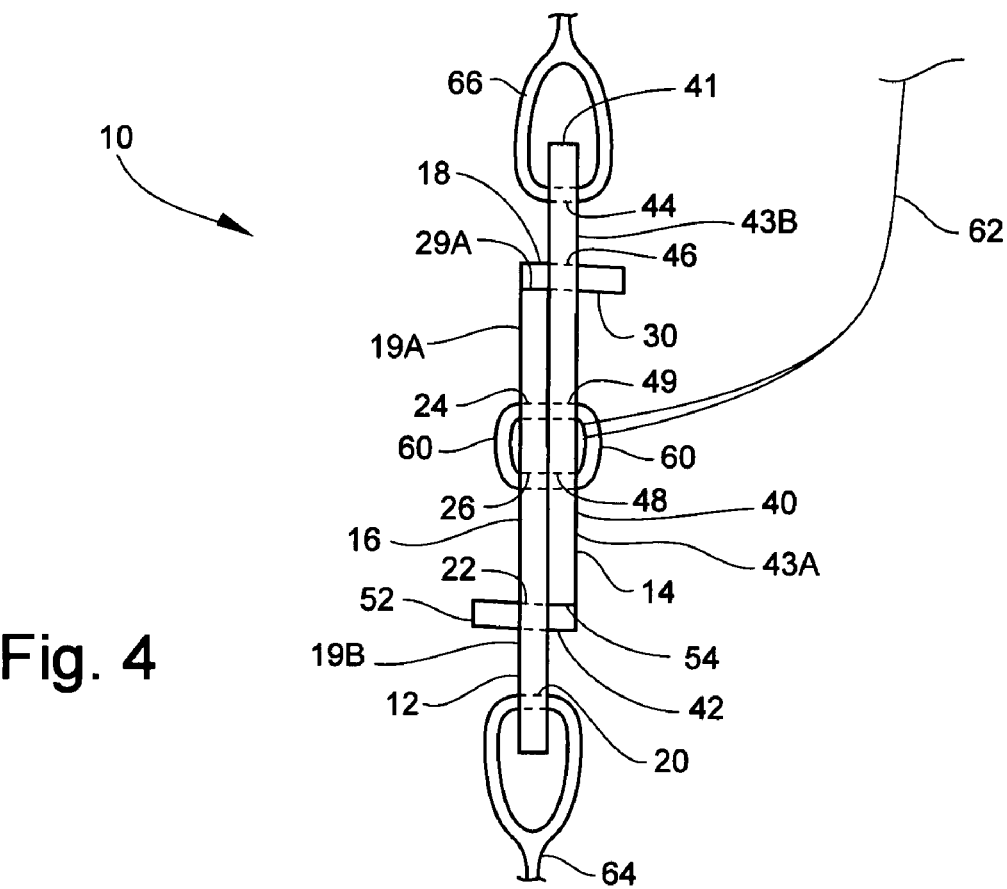

ously secured together. FIG. 2B is a view taken along line 2B-2B of FIG. 2A;
APPARATUS FOR RELEASING A PARACHUTE FROM ITS PAYLOAD

STATEMENT OF GOVERNMENT INTEREST

The invention described herein may be manufactured and used by or for the Government of the United States of America for Governmental purposes without payment of any royalties thereon or therefor.

BACKGROUND OF THE INVENTION

1. Field of the Invention

The present invention generally relates to an apparatus for releasing a parachute from its payload upon ground impact by the payload.

2. Description of the Related Art

Parachutes are frequently used to deliver payloads to specific locations on the ground when it is not possible for aircraft to land. Typically, such locations are isolated and not accessible by other means of transportation. Parachutes have become one of the main forms of payload delivery to military or civilian personnel located in isolated areas.

If the parachute remains connected to the payload when the payload hits the ground, winds or other air-turbulence can cause the parachute to drag the payload over the ground. This can damage or destroy the payload.

Various prior art devices for releasing a parachute from its payload are described in U.S. Pat. Nos. 2,502,097, 2,562,459, 2,655,163, 2,732,245, 2,919,154, 4,619,424, and 5,687,931.

What is needed is a new and improved apparatus for instantly releasing a parachute from its payload upon ground impact by the payload.

SUMMARY OF THE INVENTION

It is a primary object of the present invention to provide a simple, efficient, durable, strong and quick-acting apparatus that instantly releases a parachute from a payload supported by the parachute when the payload impacts the ground thereby preventing wind or other air-turbulence from blowing the parachute along the ground with the payload still attached thereto.

Other objects and advantages of the present invention will be apparent from the ensuing description and the accompanying drawings.

In accordance with aforesaid object, the present invention is directed to an apparatus for releasing a parachute from its payload upon ground impact by the payload. In one embodiment, this apparatus comprises a pair of sections releasably secured to each other. Each section comprises an intermediate portion having a longitudinally extending axis and a spur receiving opening that extends through the intermediate portion and is transverse to the longitudinally extending axis, a first end portion attached to the intermediate portion and comprising a spur that extends in a generally lateral direction with respect to the longitudinally extending axis, and a second end portion attached to the intermediate portion such that the intermediate portion is between the first and second end portions. Each section further comprises means for attaching a lanyard to the section wherein in order to use the apparatus, a lanyard is attached between one of the sections and a parachute, and another lanyard is attached between the other section and a payload. The apparatus further comprises components to forcefully release the sections from each other upon ground impact by a payload that is linked to one of the sections. The apparatus includes a device that releasably engages both sections to prevent the components from prematurely forcefully releasing the sections from each other in the absence of tension forces on the apparatus. The device is responsive to the opening of the parachute canopy such upon opening of the parachute canopy, the device disengages from the sections so that the components will be free to forcefully release the sections from each other upon ground impact by the payload.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawing, in which:

FIG. 3 is a side, elevational view of another section that is configured to be releasably secured to the section shown in FIG. 1;

FIG. 4 is side, elevational view showing the apparatus in accordance with the first embodiment of the present wherein sections of FIGS. 1 and 3 are releasably secured together;

DESCRIPTION OF THE PREFERRED EMBODIMENTS

Referring to FIG. 4, there is shown apparatus 10 in accordance with one embodiment of the invention. Apparatus 10 is configured for use with payloads that weigh between about one (1) pound and three-thousand (3,000) pounds. Apparatus 10 generally comprises sections 12 and 14 that are releasably secured together. Preferably, sections 12 and 14 are substantially identical to each other in structure and geometry. Sections 12 and 14 can be fabricated from any one of a variety of materials that exhibit the required strength, e.g. metal, composites, plastics, etc. The particular material used to fabricate sections 12 and 14 is highly dependent upon the maximum force that will be applied to sections 12 and 14.

Figure 1:
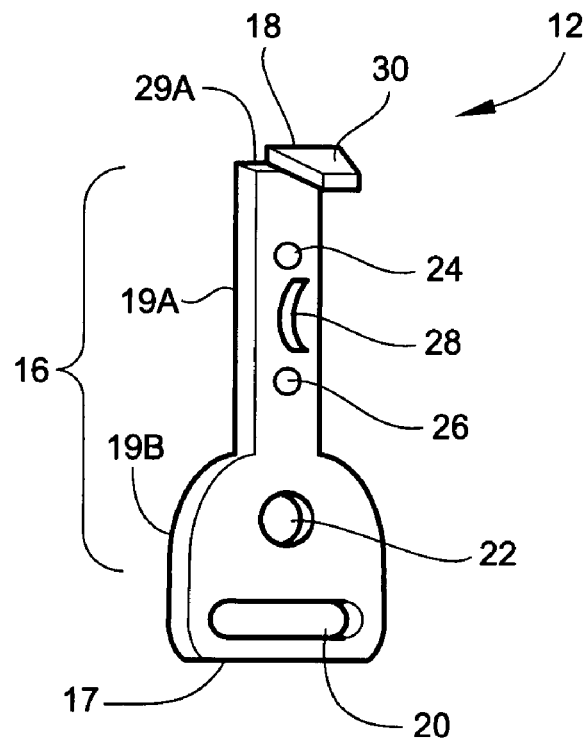
FIG. 1 is a perspective view of a section of an apparatus for releasing a parachute from its payload upon ground impact by the payload in accordance with a first embodiment of the present invention.
Figure 2A:
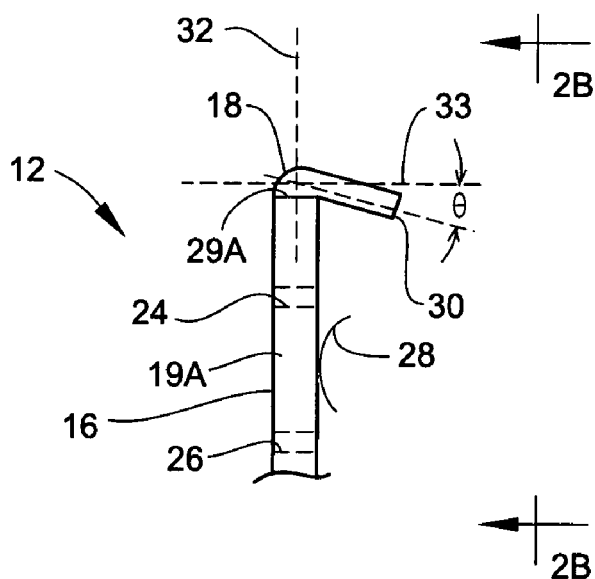
FIG. 2A is a partial, side elevational view of the section shown in FIG. 1.
Figure 2B:
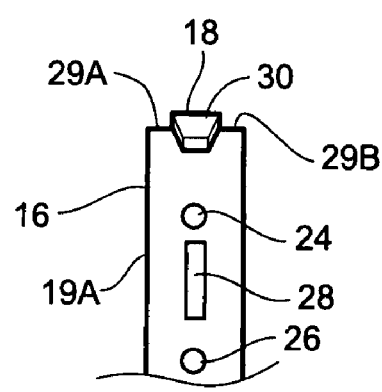
FIG. 2B is a view taken along line 2B-2B of FIG. 2A.

Referring to FIGS. 1, 2A and 2B, section 12 comprises intermediate portion 16, end portion 17 and end portion 18. Intermediate portion 16 is attached to and between end portions 17 and 18. Intermediate portion 16 comprises shank portion 19A and relatively wide portion 19B. Intermediate portion 16 has slot 20 and opening 22. Slot 20 transverses longitudinally extending axis 32. Slot 20 is in proximity to end portion 17 and is sized to receive a lanyard, line, wire, cord, etc. that is either attached to a parachute or a payload. As used herein, the term "lanyard" shall include line, cable, wire, cord, etc. Shank portion 19A includes a pair of openings 24 and 26 that are relatively smaller than opening 22. The purpose of openings 22, 24 and 26 is discussed in the ensuing description. Curved, leaf spring 28 is connected to shank portion 19A and is positioned between openings 24 and 26. End portion 18 comprises spur 30 that extends in a generally lateral direction with respect to longitudinally extending axis 32. Spur 30 has a width that is less than the width of shank portion 19A. This difference in widths provides shoulders 29A and 29B. The purposes of shoulders 29A and 29B are discussed in the ensuing description. As shown in FIG. 2A, spur 30 is angulated with respect to horizontal reference axis 33 by an angle θ. Angle θ is between about 8° and 14°. However, it is critical that the angle θ does not exceed 15°. The purpose of this configuration is discussed in the ensuing description.

Referring to FIG. 3, section 14 comprises intermediate portion 40, end portion 41 and end portion 42. Intermediate portion 40 is attached to and between end portions 41 and 42. Intermediate portion 40 comprises shank portion 43A and relatively wide portion 43B. Intermediate portion 40 has a slot 44 and opening 46 which perform the same functions as slot 20 and opening 22, respectively, of section 12. Shank portion 43A has a pair of openings 48 and 49 that are relatively smaller than opening 46. The purpose of openings 48 and 49 are the same as the purpose of openings 24 and 26, respectively, of shank portion 19A of section 12.

Referring to FIG. 3, curved, leaf spring 50 is connected to shank portion 43A and located between openings 48 and 49. The purpose of curved, leaf spring 50 is the same as that of curved, leaf spring 28 of section 12 and is discussed in the ensuing description. End portion 42 comprises spur 52. Spur 52 has substantially the same shape as spur 30 and also performs the same function as spur 30. Spur 52 has a width that is less than the width of shank portion 43A. This difference in widths provides a pair of shoulders. One of these shoulders is shoulder 54. The other shoulder is not shown. The purpose of these shoulders is the same as the purpose of shoulders 29A and 29B. Spur 52 is also angulated with respect to the longitudinally extending axis 56 of section 14. In a preferred embodiment, spur 52 is angulated by the same angle to which spur 30 (see FIG. 2A) is angulated.

Referring to FIGS. 1, 3 and 4, sections 12 and 14 are configured to be releasably secured to each other. In order to releasably secure sections 12 and 14 together, each section 12 and 14 is vertically oriented so that spur 30 of section 12 is aligned with opening 46 in section 14, and spur 52 of section 14 is aligned with opening 22 of section 12. Next, spur 30 is inserted into opening 46 of section 14, and spur 52 is inserted into opening 22 of section 12. Sections 12 and 14 are pressed together so that curved, leaf springs 28 and 50 become compressed. A safety tie 60 is inserted into through openings 24, 26 of sections 12 and openings 48 and 49 of section 14 and configured to compress sections 12 and 14 together so as to counter the opposite force produced by curved, leaf springs 28 and 50. Thus, safety tie 60 keeps sections 12 and 14 releasably secured together when tension forces do not exist on apparatus 10 thereby preventing sections 12 and 14 from being prematurely released from one another prior to the opening of the parachute canopy. Lanyard 62 is connected to safety tie 60 and to a parachute canopy (not shown). A lanyard 64 is attached to section 12 via slot 20 and then fastened to a payload (not shown). Lanyard 66 is fastened to section 14 via slot 44 and to a parachute (not shown). Although sections 12 and 14 are shown to have slot 20 and slot 44, respectively, for attaching lanyards, other alternate configurations can be used. For example, instead of slots, the sections 12 and 14 can be configured to have eye-hooks, carabiners, etc.

Referring to FIG. 4, during the opening phase of the parachute, a tension force is created in lanyard 62 which breaks safety tie 60. After safety tie 60 is broken, sections 12 and 14 are held together by the combination of the shallow angle θ of spurs 30 and 52 and the tension exerted on sections 12 and 14 by the force of the parachute and the payload. Upon ground impact by the payload, tension on apparatus 10 instantly decreases to zero, at which time curved, leaf springs 28 and 50 force sections 12 and 14 apart causing spurs 30 and 52 to become dislodged from openings 46 and 22, respectively, thereby instantly releasing sections 12 and 14 from each other. Section 14 remains connected to the parachute via lanyard 66 and section 12 remains connected to the payload via lanyard 64. As a result, the parachute is separated from the payload. Thus, apparatus 10 effects instant release of the parachute from the payload after ground impact so that the payload will not be dragged by the parachute.

If, upon ground impact by the payload, spur 52 becomes dislodged from opening 22 before spur 30 becomes dislodged from opening 46, shoulders 29A and 29B prevent the entire shank section 19A of section 12 from sliding through opening 46. Similarly, if, upon ground impact by the payload, spur 30 becomes dislodged from opening 46 before spur 52 becomes dislodged from opening 22, the shoulders (e.g. shoulder 54) of end portion 42 prevent the entire shank section 43A of section 14 from sliding through opening 22.

In a preferred embodiment, sections 12 and 14 are substantially identical in shape and structure. Thus, it does not matter which of these sections is attached to the parachute or the payload. Apparatus 10 can be connected to one or more parachutes.

Figure 7:
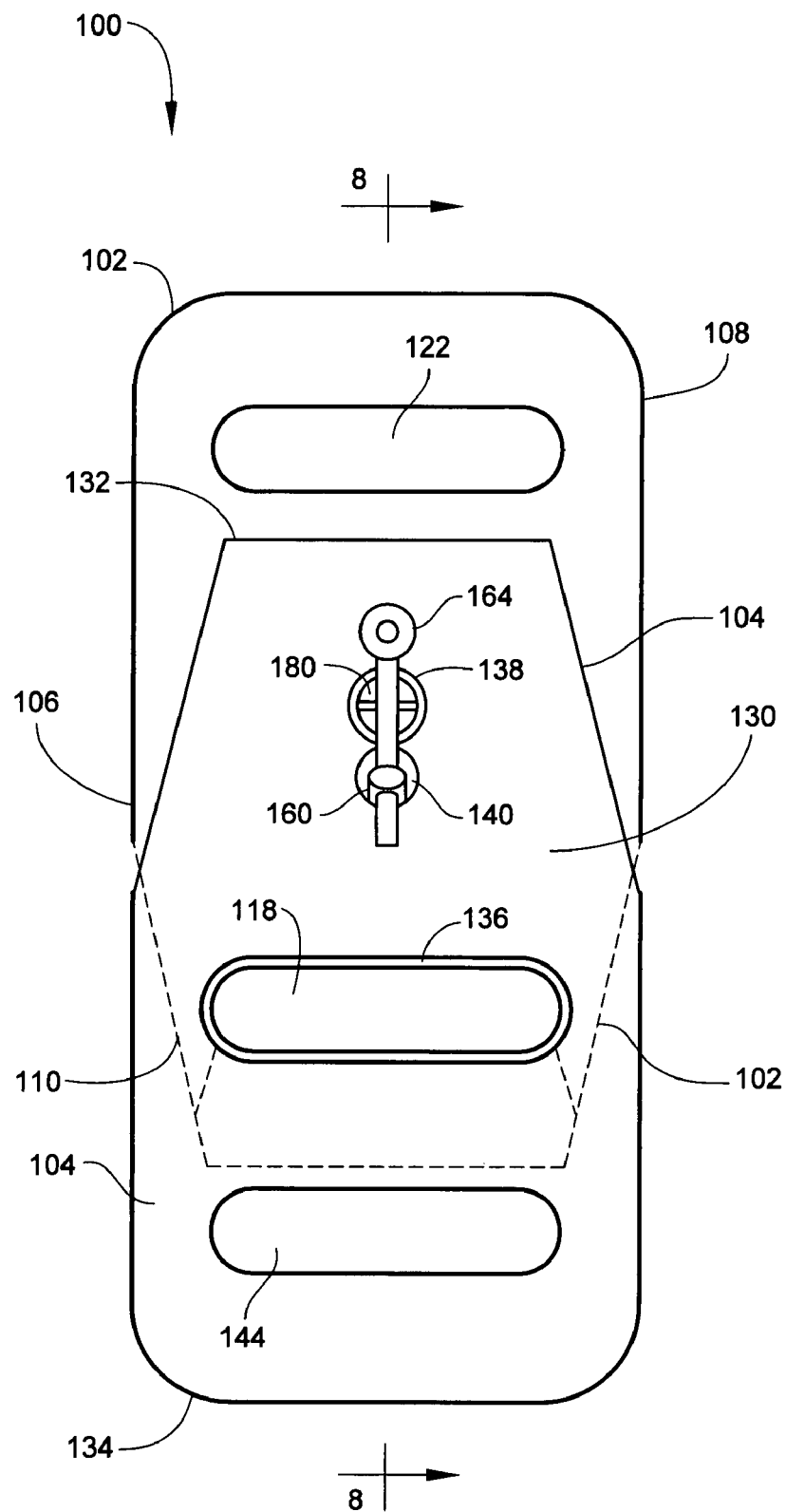
FIG. 7 is a rear, elevational view of the apparatus in accordance with the second embodiment of the present invention.
Figure 8:
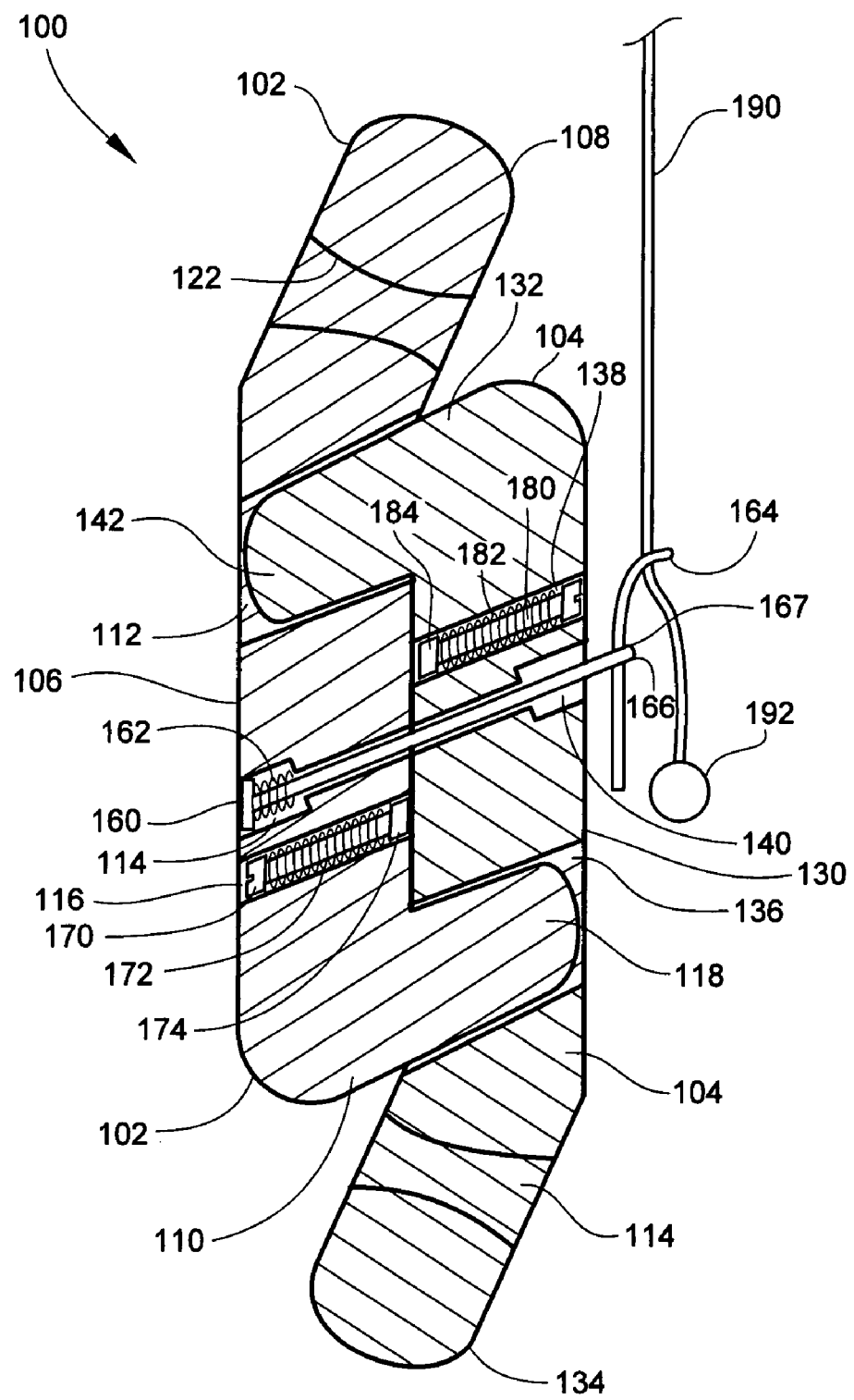
FIG. 8 is a cross-sectional view taken along line 8-8 in FIG. 7.

Referring to FIGS. 7 and 8, there is shown an apparatus 100 for releasing a parachute from its payload in accordance with another embodiment of the present invention. Apparatus 100 is configured to be used with payloads that are heavier than 3000 pounds. Apparatus 100 comprises section 102 and section 104. In a preferred embodiment, sections 102 and 104 are substantially identical in structure and shape.

Figure 5:
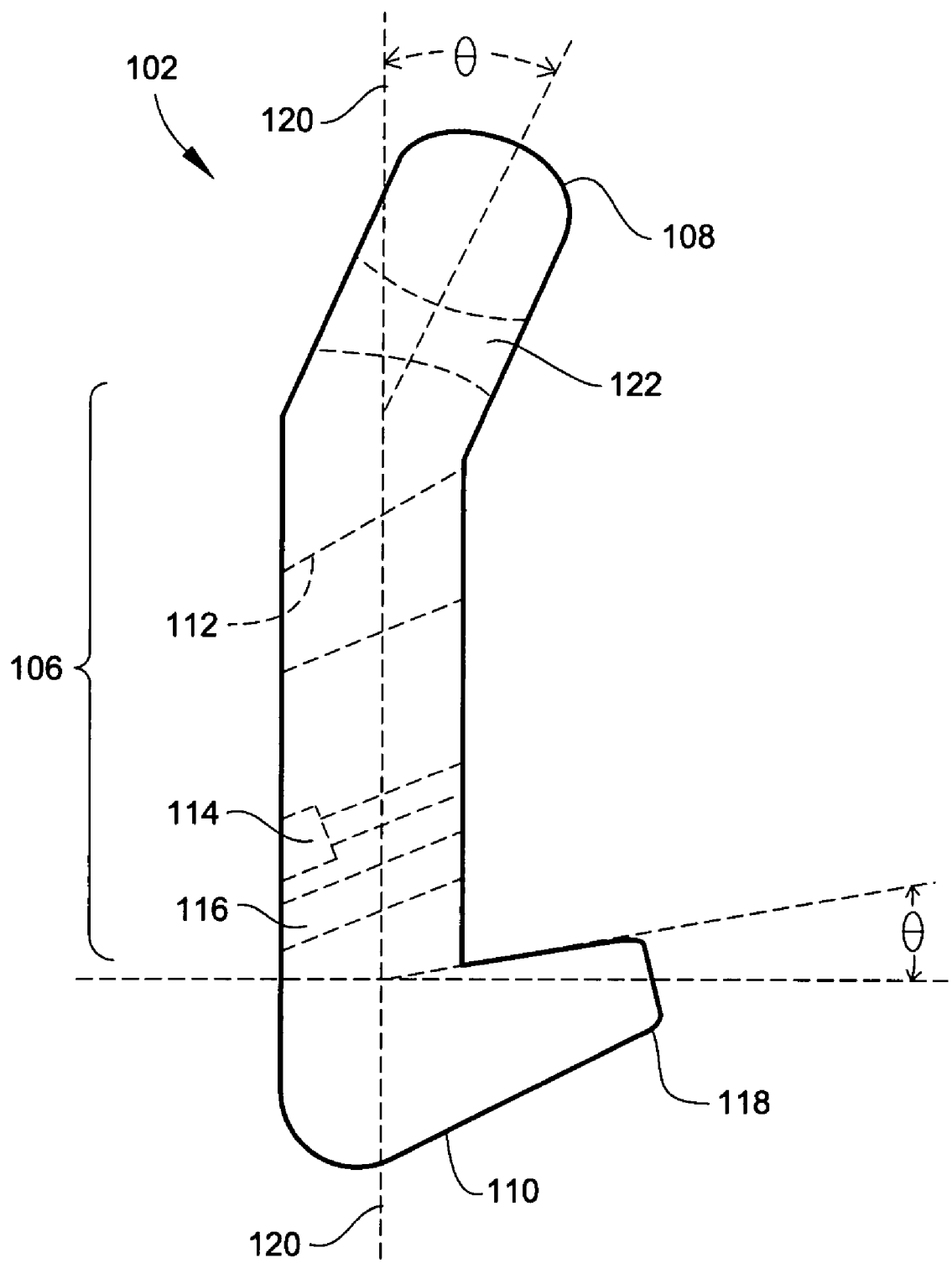
FIGS. 5 and 6 are side, elevational views of sections that that are configured to be releasably secured to each other to form an apparatus for releasing a parachute from its payload upon ground impact by the payload in accordance with a second embodiment of the present invention.

Referring to FIG. 5, section 102 generally comprises intermediate portion 106, end portion 108 and opposite end portion 110. End portions 108 and 110 are attached to intermediate portion 106 such that intermediate portion 106 is between end portions 108 and 110. Section 102 has slanted opening 112 which extends through the thickness of section 102 and which transverses longitudinally extending axis 120. Slanted opening 112 is sized for receiving spur 142 of section 104 (see FIGS. 6 and 8). Section 102 further includes bore 114 and threaded bore 116 which also extend through the thickness of section 102 and transverse longitudinally extending axis 120. Bore 114 is sized for receiving a safety lock pin assembly that is described in the ensuing description. Threaded bore 116 is sized for receiving a plug screw assembly which is also described in the ensuing description. End portion 110 comprises spur 118 that is angulated with respect to longitudinally extending axis 120 by angle θ. Angle θ is between about 8° and 14°. It is critical that angle θ does not exceed 15°. End portion 108 is angulated with respect to longitudinally extending axis 120 by angle θ. It is critical that angle θ does not exceed 12°. Section 102 further includes opening 122 that receives a lanyard, line, wire, cable, rope, etc. that is attached to either a parachute or payload. As used herein, the term "lanyard" shall include line, wire, cable, rope, etc. In a preferred embodiment, opening 122 is configured as a slot.

Figure 6:
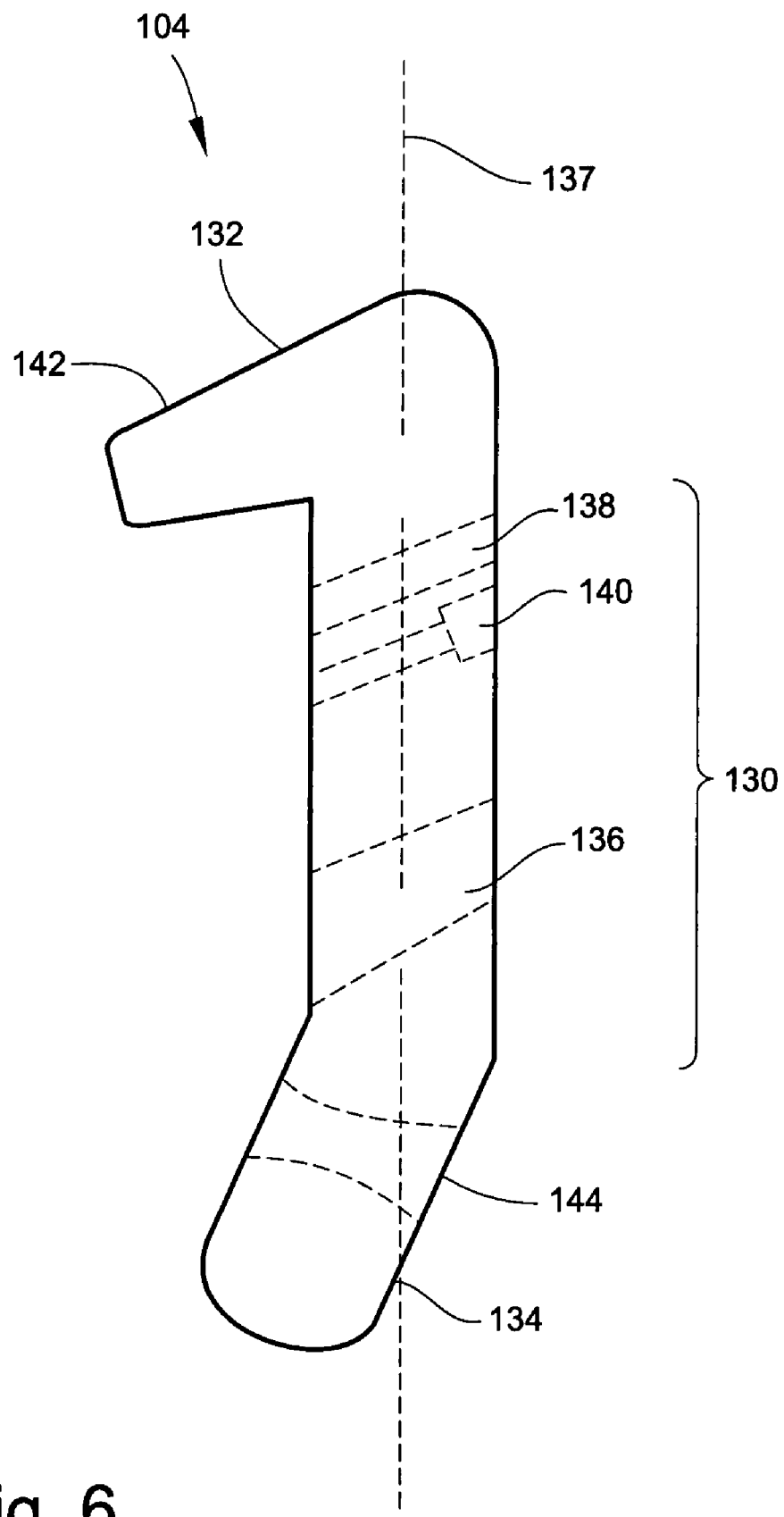

Referring to FIG. 6, section 104 generally comprises intermediate portion 130 and end portions 134 and 132 that are attached to intermediate portion 130. Intermediate portion 130 is between end portions 134 and 132. Intermediate portion 130 has slanted opening 136 that extends through the thickness of section 130 and transverses longitudinally extending axis 137. The purpose of slanted opening 136 is sized to receive spur 118 of section 102 (see FIG. 5). Section 104 further includes threaded bore 138 and bore 140 that extend through the thickness of section 104. Threaded bore 138 is sized for a receiving plug screw assembly which is described in the ensuing description. Bore 140 is sized for receiving a safety lock pin assembly that is also described in the ensuing description. End portion 132 comprises spur 142 that is angulated in the same manner as spur 118 of section 102. End portion 134 is angulated in the same manner as end 108 of section 102. Section 104 further includes opening 144 that receives lanyard that is attached to either a parachute or payload. In a preferred embodiment, opening 144 is configured as a slot (see FIG. 7).

Although sections 102 and 104 are shown to have slot 122 and slot 144, respectively, for attaching lanyards, other alternate configurations can be used. For example, instead of slots, the sections 102 and 104 can be configured to have eye-hooks, carabiners, etc.

Referring to FIGS. 7 and 8, in order to releasably secure sections 102 and 104 together, spur 142 of section 104 is inserted into slanted opening 112 of section 102, and spur 118 of section 102 is inserted into slanted opening 136 of section 104. Next, safety lock pin 160 and ejection spring 162 are inserted into bore 114. Ejection spring 162 is mounted on safety lock pin 160. Trigger pin 164 is inserted into a cavity or bore 166 that is near distal end 167 of safety lock pin 160. Next, plug screw assemblies are inserted into threaded bores 116 and 138 of sections 102 and 104, respectively. Specifically, a plug screw assembly comprising plug screw 170, separation spring 172 and contact member 174 are inserted into threaded bore 116. Spring 172 is mounted on contact member 174. Plug screw 170 is screwed into threaded bore 116 until contact member 174 abuts intermediate portion 130 of section 104 and spring 172 is significantly compressed between plug screw 170 and contact member 174. Similarly, a plug screw assembly comprising plug screw 180, separation spring 182 and contact member 184 are inserted into threaded bore 138. Spring 182 is mounted on contact member 184. Plug screw 180, spring 182 and contact member 184 function in the same manner as plug screw 170, spring 172 and contact member 174, respectively. Plug screw 180 is screwed into threaded bore 138 until contact member 184 abuts intermediate portion 106 of section 104 and spring 182 is significantly compressed between plug screw 180 and contact member 184.

As shown in FIG. 8, a lanyard 190 is fastened to a parachute canopy (not shown) and inserted through an opening in trigger pin 164. Cable stop 192 is connected to the end of lanyard 190. Another lanyard (not shown) is fastened to section 104 via opening 144 and to a payload (not shown). A further lanyard (not shown) is fastened to section 102 via opening 122 and to the parachute (not shown). During the opening phase of the parachute canopy, tension forces are applied to apparatus 100 which force sections 102 and 104 tightly together. Lanyard 190 is drawn up by the parachute canopy until cable stop 192 contacts trigger pin 164. Further movement of lanyard 190 withdraws trigger pin 164 from safety lock pin 160. Once this occurs, ejection spring 162 ejects safety lock pin 160 from bore 114 thereby arming the apparatus 100 such that sections 102 and 104 will be free to separate from one another once the payload impacts the ground. As the parachute and payload descend, tension is applied to apparatus 100. This tension, in combination with the placement of angled spurs 118 and 142 in slanted openings 136 and 112, respectively, keep sections 102 and 104 secured together during descent. Upon ground impact of the payload, the tension force between the parachute and payload instantly decreases to zero thereby allowing separation springs 172 and 182 to force sections 102 and 104 apart such that spurs 118 and 142 are ejected from openings 136 and 112, respectively. When this occurs, sections 102 and 104 are completely separated from each other, section 102 remains connected to the parachute and section 104 remains connected to the payload.

Thus, apparatus 100 effects instant release of the parachute from the payload after ground impact so that the payload will not be dragged or overturned. Thus, the payload is prevented from being damaged or destroyed.

Since sections 102 and 104 are identical in geometry and construction, it does not matter which section is attached to the parachute or payload. Apparatus 100 can be connected to one or more parachutes.

The apparatus of the present invention is scalable in size, mass, and strength depending upon load requirements The foregoing description of the preferred embodiments of the invention has been presented for purposes of illustration and description only. It is neither intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. An apparatus for releasing a parachute from its payload upon ground impact by the payload, comprising:
   a pair of sections releasably secured to each other, each section comprising:
      an intermediate portion having a longitudinally extending axis and a spur receiving opening that extends through the intermediate portion and is transverse to the longitudinally extending axis,
      a first end portion attached to the intermediate portion and comprising a spur that extends in a generally lateral direction with respect to the longitudinally extending axis,
      a second end portion attached to the intermediate portion such that the intermediate portion is between the first and second end portions,
      wherein the spur of one section is disposed in the spur receiving opening of the other section,
      means for attaching a lanyard to the section,
      wherein in order to use the apparatus, a lanyard is attached to and between one of the sections and a parachute, and another lanyard is attached to and between the other section and a payload; and
   components to forcefully release the sections from each other when a payload linked to one of the sections impacts the ground; and
   a device releasably engaged to both sections to prevent the components from prematurely forcefully releasing the sections from each other, the device being responsive to the opening of a parachute canopy such that when the parachute canopy opens, the device disengages from the sections so that the components will be free to forcefully release the sections from each other upon ground impact by the payload;
   wherein each section has a threaded bore that extends through the intermediate portion and is transverse to the longitudinally extending axis and has an opening that confronts the other section, and wherein the components comprise:
a threaded member screwed into the threaded bore;
a contact member movably positioned in the bore; and
a spring member interposed between the contact member and the threaded member so that as the threaded member is screwed into the threaded bore, the spring member becomes compressed thereby forcing the contact member to protrude from the opening of the bore and apply a force to the other section.

2. The apparatus according to claim 1 wherein the spur of each section is angulated with respect to the longitudinally extending axis.

3. The apparatus according to claim 2 wherein the spur receiving opening in each intermediate portion is slanted so as to receive the angulated spur of the other section.

4. The apparatus according to claim 1 wherein the sections are identical to each other.

5. A section of an apparatus for releasing a parachute from its payload upon ground impact by the payload wherein the apparatus comprises two such sections releasably secured together, the section comprising:
an intermediate portion having a longitudinally extending axis and a spur receiving opening that extends through the intermediate portion and is transverse to the longitudinally extending axis;
a first end portion attached to the intermediate portion and comprising a spur that extends in a generally lateral direction with respect to the longitudinally extending axis and which is angulated with respect to the longitudinally extending axis, a second end portion attached to the intermediate portion such that the intermediate portion is between the first and second end portions, a spring member attached to the intermediate portion and oriented so that it is compressed when the intermediate portion is pressed against the other section of the apparatus;
means for attaching a lanyard to the section and;
components to forcefully release the sections from each other when a payload linked to one of the sections impacts the ground;
wherein each section has a threaded bore that extends through the intermediate portion and is transverse to the longitudinally extending axis and has an opening that confronts the other section, and wherein the components comprise:
a threaded member screwed into the threaded bore;
a contact member movably positioned in the bore; and
wherein the spring member is interposed between the contact member and the threaded member so that as the threaded member is screwed into the threaded bore, the spring member becomes compressed thereby forcing the contact member to protrude from the opening of the bore and apply a force to the other section.

6. An apparatus for releasing a parachute from its payload upon ground impact by the payload, comprising:

a pair of sections releasably secured to each other, each section comprising:
an intermediate portion having a longitudinally extending axis and a spur receiving opening that extends through the intermediate portion and is transverse to the longitudinally extending axis,
a first end portion attached to the intermediate portion and comprising a spur that extends in a generally lateral direction with respect to the longitudinally extending axis and which is angulated with respect to the longitudinally extending axis,
a second end portion attached to the intermediate portion such that the intermediate portion is between the first and second end portions,
a spring member attached to the intermediate portion and oriented so that it is compressed when the intermediate portion is pressed against the other section,
means for attaching a lanyard to the section, and
wherein the spur of one section is disposed in the spur receiving opening of the intermediate portion of the other section and the spring members are compressed between the sections thereby urging the sections away from each other; and
a device engaging both sections to counter the urging force produced by the spring members and keep the sections compressed together, the device being responsive to the force produced by the opening of a parachute canopy such that upon the opening of the parachute canopy, the device disengages from the sections so that the spring members will be free to forcefully release the sections from each other upon ground impact by a payload that is supported by one of the sections;
means for linking the canopy of the parachute to the device and;
components to forcefully release the sections from each other when a payload linked to one of the sections impacts the ground;
wherein each section has a threaded bore that extends through the intermediate portion and is transverse to the longitudinally extending axis and has an opening that confronts the other section, and wherein the components comprise:
a threaded member screwed into the threaded bore;
a contact member movably positioned in the bore; and
wherein each spring member is interposed between a contact member and a threaded member so that as the threaded member is screwed into the threaded bore, the spring member becomes compressed thereby forcing the contact member to protrude from the opening of the bore and apply a force to the other section.

7. The apparatus according to claim 6 wherein the intermediate portion of each section has at least one additional opening that is adjacent to the spring member.

8. The apparatus according to claim 6 wherein the means for attaching a lanyard to the section comprises a slot located in the intermediate portion.

* * * * *